United States Patent
Ren et al.

(10) Patent No.: US 11,294,931 B1
(45) Date of Patent: Apr. 5, 2022

(54) CREATING REPLICAS FROM ACROSS STORAGE GROUPS OF A TIME SERIES DATABASE

(71) Applicant: Amazon Technologies, Inc., Seattle, WA (US)

(72) Inventors: Zhong Ren, Seattle, WA (US); Dumanshu Goyal, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 172 days.

(21) Appl. No.: 16/577,931

(22) Filed: Sep. 20, 2019

(51) Int. Cl.
*G06F 16/20* (2019.01)
*G06F 16/27* (2019.01)
*G06F 16/23* (2019.01)

(52) U.S. Cl.
CPC .......... *G06F 16/27* (2019.01); *G06F 16/2379* (2019.01)

(58) Field of Classification Search
None
See application file for complete search history.

(56) References Cited

U.S. PATENT DOCUMENTS

| 10,007,690 B2 | 6/2018 | Finkler | |
| 2007/0156793 A1* | 7/2007 | D'Souza | G06F 11/203 |
| 2014/0006354 A1* | 1/2014 | Parkison | G06F 3/067 |
| | | | 707/649 |
| 2014/0006465 A1* | 1/2014 | Davis | G06F 16/183 |
| | | | 707/827 |
| 2014/0279900 A1* | 9/2014 | Gupta | G06F 16/219 |
| | | | 707/634 |
| 2018/0293280 A1 | 10/2018 | Svec | |
| 2019/0079943 A1 | 3/2019 | Snavely et al. | |
| 2019/0155699 A1* | 5/2019 | Luo | G06F 11/1451 |
| 2019/0243836 A1* | 8/2019 | Nanda | G06F 16/258 |

\* cited by examiner

*Primary Examiner* — Jau Shya Meng
(74) *Attorney, Agent, or Firm* — Robert C. Kowert; Kowert, Hood, Munyon, Rankin & Goetzel, P.C.

(57) ABSTRACT

Creating replicas of a time series database from across storage groups may be implemented for a time series database. Updates to a time series database may be maintained in an update log. Updates may be obtained from the log and ingested at different groups of copies of the time series database used to perform queries. Updates may be ingested at different rates at the different groups. A new copy may be added to one of the groups by copying a portion of the time series database for the new copy determined to be present in another group of copies and an update not found in the other from the log to the new copy.

20 Claims, 8 Drawing Sheets

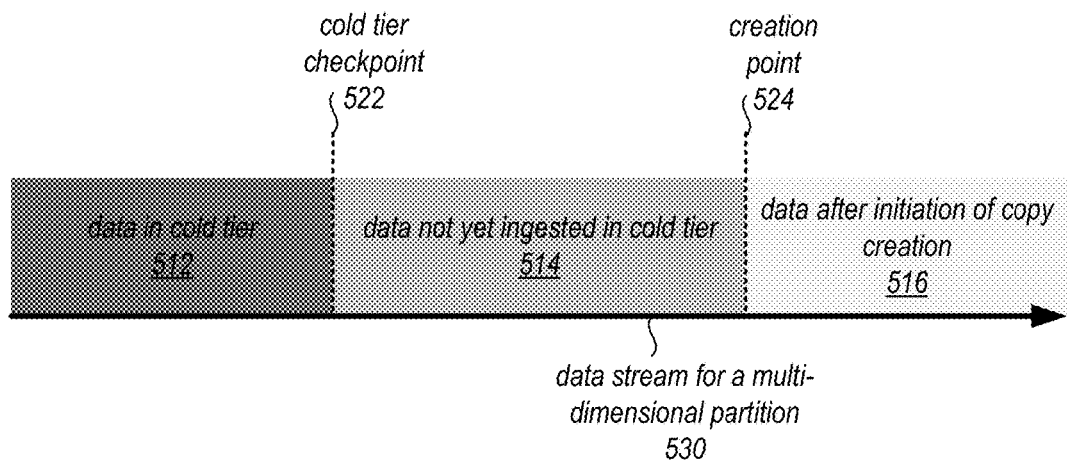
FIG. 5
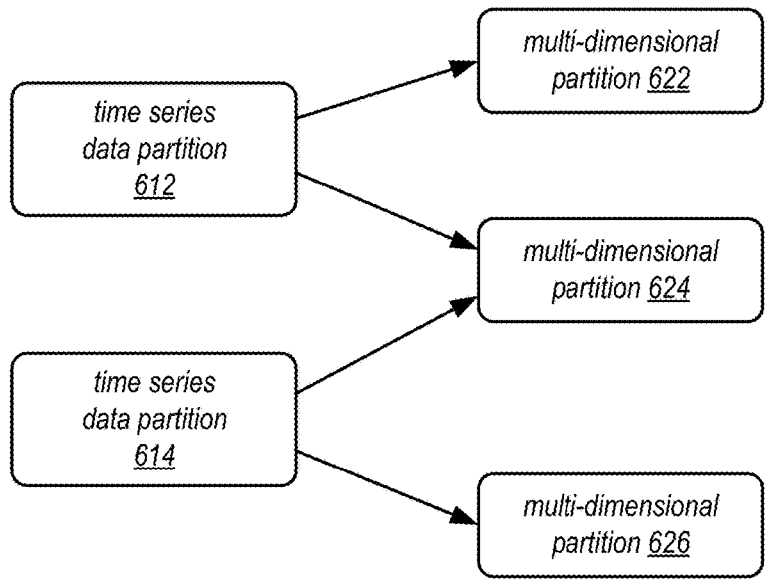
FIG. 6A
| multi-dimensional partition ID | time series data partition ID | last committed sequence number | last committed metadata version |
|---|---|---|---|
| 622 | 612 | 50 | v8 |
| 624 | 612 | 40 | v5 |
| 624 | 614 | 120 | v5 |
| 626 | 614 | 128 | v2 |
partition mapping data 630
FIG. 6B

CREATING REPLICAS FROM ACROSS STORAGE GROUPS OF A TIME SERIES DATABASE

BACKGROUND

Database systems managing large amounts of data on behalf of users may distribute and/or replicate that data across two or more machines, often in different locations, for any of a number of reasons, including security issues, disaster prevention and recovery issues, data locality and availability issues, etc. As the scale of data stored increases, database systems may implement different techniques for distributing and replicating data that can cope with the increasing demand upon data storage resources to provide highly performant access to data while still preserving the various management features that contribute to data availability and durability. For example, multiple copies of data may be stored at different locations in order to distribute the risk of failure amongst the differently locations.

Failures of host systems that store copies of database data may result in attempts to create new copies in order to mitigate the effect of the failure. Other scenarios for creating new copies, such as increases in demand upon a database, may also occur. Therefore, techniques to add copies of database data without straining the resources currently hosting the database may be highly desirable.

BRIEF DESCRIPTION OF THE DRAWINGS

FIG. 5 is a logical diagram of a data stream for creating a new copy of a multi-dimensional partition, according to some embodiments.

FIGS. 6A-6B illustrate mappings between time series data partitions and multi-dimensional data partitions stored and accessed for performing queries in a hot storage tier, according to some embodiments.

Figure 1:
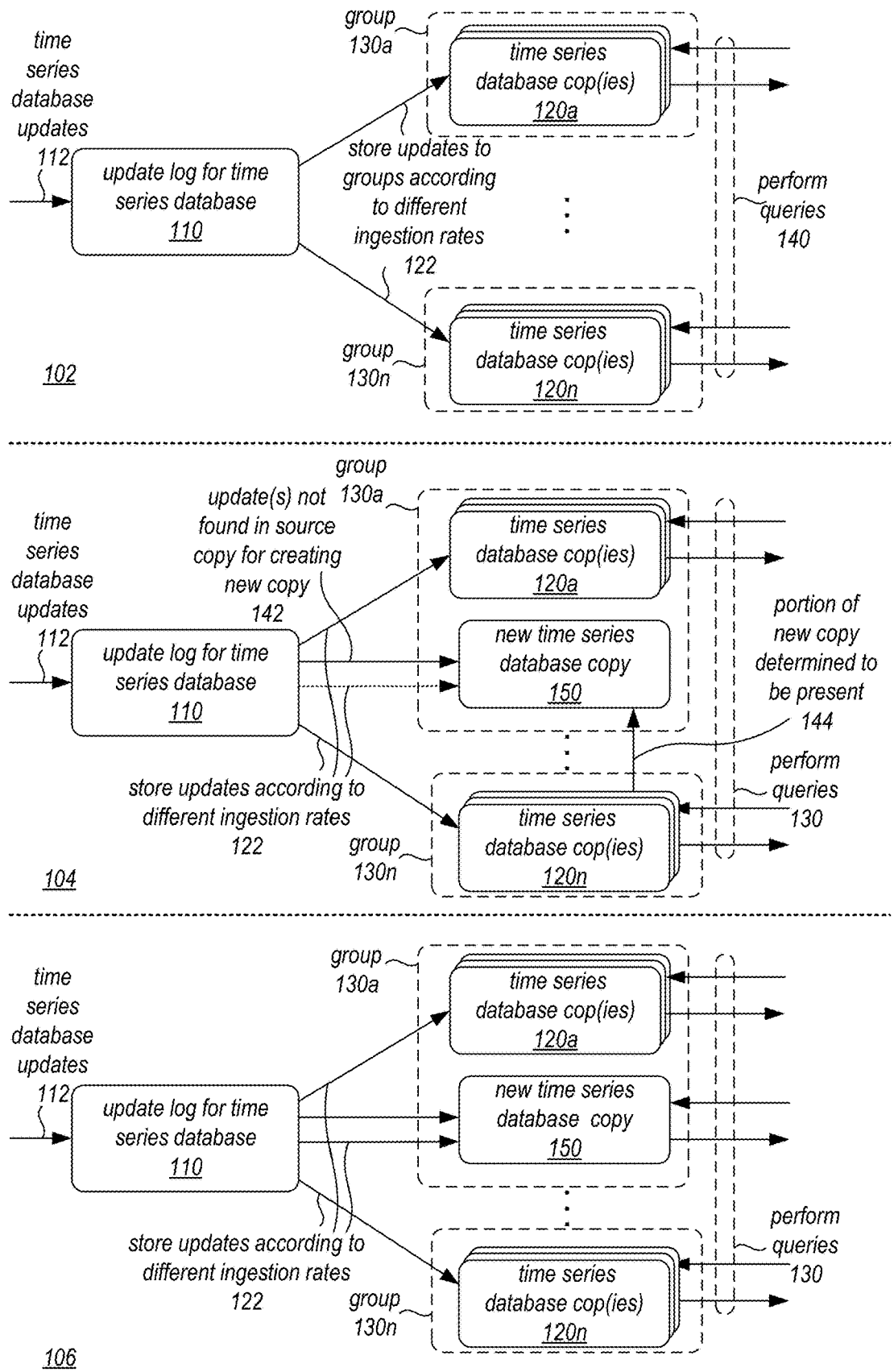
FIG. 1 is a logical block diagram illustrating creating replicas from across storage groups of a time series database, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Techniques for creating replicas from across storage groups of a time series database may be described herein. Time series databases, in various embodiments, may store time series data (e.g., data value(s) indexed, associated with, referencing, or otherwise marked according to time), which may be subsequently queried to perform various types of requests or analyses upon the time series data. Time series databases may distribute copies of data in a time series database, in various embodiments, in order to increase the availability, reliability and performance of the time series database to perform queries. For example, as discussed in detail below with regard to FIGS. 1-3, different groups, such as different storage tiers, could offer different types of storage and query performance. Storing multiple copies, for example, may allow for requests accessing different items of data in a same time series database to parallelize the work among different systems which can utilize respective copies to perform the work for the access requests, in some embodiments.

In order to provide the benefits of storing multiple copies, new copies of data of a time series database may be created in different scenarios. For example, if a storage host, node, or other computing system storing one copy of time series data fails (or otherwise becomes unavailable), then a new copy of the time series database may be created to replace the unavailable copy of time series data. In some embodiments, the different characteristics of different groups of copies may involve more or less frequent scenarios where adding a new copy of a time series database. For instance, a copy that is stored in a volatile storage device (e.g., memory) may have a different durability characteristic than a copy stored in a block-based storage device (e.g., hard disk drive), which may result in more susceptibility to events (e.g., power failure, process restart, etc.) that would initiate adding a new copy of the time series database.

Techniques for creating a new copy, however, may have to account for different performance or architectural concerns. For instance, one concern may be the impact of creating a new copy of data (e.g., minimizing workload imposed on other hosts that store a copy of data which may also be servicing client requests to access the data). In various embodiments, creating replicas from across storage groups of a time series database may avoid, address, or otherwise minimize negative performance impacts that creating a new copy of data for a time series database would otherwise incur, thus improving the capabilities of a time series database to create copies of data to maintain or increase the benefits of data distribution, as discussed above. For example, if one group of copies has suffered one or more failures, reducing the available copies from that group to perform queries to the time series database, then creating one or more new copies to add to the group using data and resources from other storage groups may reduce the impact upon the availability of the remaining copy in the group to continue providing access to the copy for queries (e.g., the remaining copy can devote its resource to query processing without having to copy or perform other operations to create the new copy in the same group).

FIG. 1 is a logical block diagram illustrating creating replicas from across storage groups of a time series database, according to some embodiments. Time series data may be added to a time series database through an ingestion process, in some embodiments. For example, a time series database may be an append-only database where time series data is immutable when individual records, data points, or other data objects are received and ingested into the time series database in idempotent fashion so that ingesting the same records, data points, or other data objects may result in the same content stored in the database (e.g., multiple requests to ingest the same record may result in one copy of the record being stored in the time series database), in some embodiments. In at least some embodiments, not all of a time series database may be stored in one object or copy of the time series database. For instance, time series database cop(ies) 120*a* may store one (or multiple) multi-dimensional partitions, as discussed below with regard to FIGS. 3-6, whereas time series database cop(ies) 120*n* may store time series data as data partitioned in different value ranges.

As illustrated in scene 102 of FIG. 1, different groups of time series database copies, such as groups 130*a* through 130*n* may be implemented that include different respective time series database cop(ies) 120*a* through 120*n* to perform queries 140 to the time series database, in some embodiments. The different groups 130 may offer different performance, storage, and/or query processing characteristics. For example, as discussed below with regard to FIGS. 3-6, one group may be a hot storage tier, which may implement an in-memory data store, performing queries using a copy of time series database data maintained in memory for fast access times and other query processing performance benefits, whereas another group may be a cold storage tier, which may offer high capacity storage for large amounts of time series data (e.g., a storage window of weeks or months when compared to a shorter storage window for a hot storage tier, such as a single day). Although two groups are illustrated, multiple other groups may also be implemented, relying on various hardware or other storage device technologies, data formats, indexes, or other features to provide different characteristics for performing queries (e.g., filtered data for certain values, secondarily indexed data, etc.). In at least some embodiments, as discussed in more detail below with regard to FIGS. 3-6, different groups may store time series data according to different partitioning schemes (e.g., different partition keys, different partition dimensions, etc.).

Time series database data may be generated from one or multiple sources (e.g., log data, Internet of Things (IoT) generated data, operational data for various systems, etc.). Time series data may be added or otherwise ingested as time series database updates 112, in some embodiments. The updates may be initially ordered and stored in update log for time series database 110, in some embodiments. For example, an ingestion pipeline, ingestion fleet, or other frontend for the time series database may receive time series data as updates 112, order the updates 112, and append the updates 112 to update log 110. Although illustrated logically as a single log, in various embodiments as discussed below with regard to FIGS. 2-7, the update log may be distributed and/or partitioned.

In various embodiments, updates may then be obtained from the log and stored 122 into the different groups 130 as part of different time series database copies 120. As indicated in scene 102, in at least some embodiments, the updates may be stored according to different ingestion rates. For example, updates to group 130*a* may be streamed in individual or small batches so that copies 120*a* of group 130*a* may provide the most recent (or current) view of a time series database for performing queries. Updates to group 130*n*, however could be stored at a different ingestion rate (e.g., in large batches at time-based or size-based intervals and/or stored according to a different partitioning scheme that takes less or more time to prepare, format, and/or store). In some embodiments, the ingestion rates may be based the format, storage devices, configuration, or other features of the different groups. For instance, the ingestion rate to an in-memory data structure for a copy of the time series database may be faster than the ingestion rate to a collection of time series database files stored in a block-based storage device. As noted above, other performance characteristics, including features such as indexes, or other metadata used to perform queries may impact or determine the ingestion rate for a group of copies.

As illustrated in scene 104, a new time series database copy 150 may be added to group 130*a*. A new copy may be added to a group in various different scenarios. For instance, one, multiple or all existing copies could fail or otherwise become unavailable so that the group is empty or operating with a below threshold number of copies for that group. In another example, a copy may be added to increase availability or durability of a group which may already be at or above a threshold number of copies. In some embodiments, a new copy may be created to create a new group of copies (e.g., a new group between a hot storage tier and cold storage tier). A control plane, or other component for a time series database, may detect an event to add a new copy of the time series database, such as new time series database copy 150. As discussed in detail below, the new host 130 may be provisioned from available systems, nodes, or devices (e.g., computing system 1000 in FIG. 9 below).

As illustrated in scene 104, new time series database copy 150 may be created from another group, group 130*n*. For example, a portion of the new copy (e.g., values in a multi-dimensional partition) may be determined to be present in group 130*n* (e.g., using a cold tier checkpoint as discussed below with regard to FIG. 5). The present portion may be copied 144 to create new time series database copy 150. As ingestion rates to group 130*n* may be different than group 130*a*, other data not present in group 130*n* may also need to be obtained. In some embodiments, the other data not present in group 130*n* could be obtained from another group (not illustrated). In some embodiments, the data may be updated by obtaining update(s) not found in the source copy in group 120*n* and applied 142 to the create the new time series database copy 150. In some embodiments, the new time series database copy 150 may also begin receiving additional updates 122 as part of the ingestion process according to the ingestion rate for group 130*a*.

As illustrated in scene 106, the time series database copy 150 may be made available for performing queries 130 when the data obtained from group 130*n* and the update log 110 (which was not present in group 130*n*) is obtained and stored.

Please note that previous descriptions of creating replicas from across storage groups of a time series database, are not intended to be limiting, but are merely provided as logical examples. For example, the number, size, type, and arrangement of copies, ingestion processes, or other illustrated features may be different than those discussed above with regard to FIG. 1

This specification begins with a general description of a provider network that may implement a time series database service that may implement creating replicas from across storage groups of a time series database. Then various examples of a time series database service are discussed, including different components/modules, or arrangements of components/module, that may be employed as part of implementing the time series database service, in one embodiment. A number of different methods and techniques to implement creating replicas from across storage groups of a time series database are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
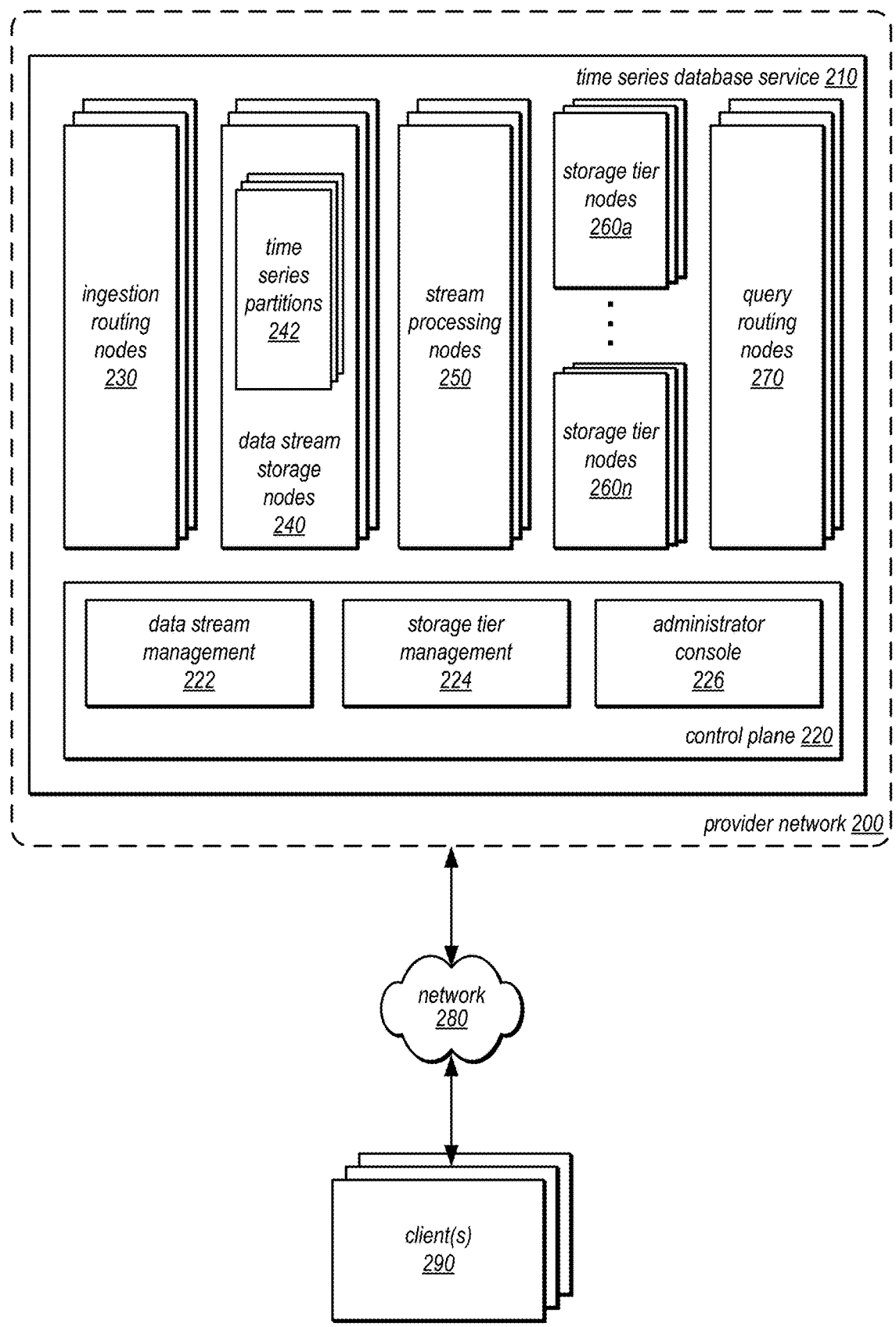
FIG. 2 is a logical block diagram illustrating a provider network offering a time series database service that may implement creating replicas from across storage groups of a time series database, according to some embodiments.

FIG. 2 is a logical block diagram illustrating a provider network offering a time series database service that may implement creating replicas from across storage groups of a time series database, according to some embodiments. Provider network 200 may be a private or closed system, in one embodiment, or may be set up by an entity such as a company or a public sector organization to provide one or more services (such as various types of cloud-based storage) accessible via the Internet and/or other networks to clients 290, in another embodiment. In one embodiment, provider network 200 may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and storage services offered by the provider network 200. In one embodiment, provider network 200 may implement various computing resources or services, such as time series database service 210 (e.g., a database service that indexes or otherwise provides access to data modeled as time series of items (e.g., records)), and other services (not illustrated), such as a data warehouse service, data flow processing service, and/or other large scale data processing techniques), data storage services (e.g., an object storage service, block-based storage service, or data storage service that may store different types of data for centralized access), virtual compute services, and/or any other type of network-based services (which may include various other types of storage, processing, analysis, communication, event handling, visualization, and security services).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes) or hosts, in one embodiment, each of which may be similar to the computer system embodiment illustrated in FIG. 9 and described below. In one embodiment, the functionality of a given system or service component (e.g., a component of time series database service 210) may be implemented by a particular node or may be distributed across several nodes. In some embodiments, a given node may implement the functionality of more than one service system component (e.g., more than one data store component).

Time series database service 210 may be implemented in one embodiment, to store items (e.g., records, objects, logs, etc.) as a time series in a time series database. Such a service may be an enterprise-class database system that is highly scalable and extensible. In at least some embodiments, time series database service 210 may implement a fully-managed time series database service, where a user does not directly provision or manage any underlying hardware, architecture, or software, but instead specifies data sources, performance characteristics, and/or other features to be available to a client application of the time series database service, which can then access the time series database through various network-based interfaces.

In one embodiment, access requests (e.g., requests to get/obtain items, put/insert items, delete items, update or modify items, scan multiple items) may be directed to a time series in time series database service 210 that is distributed across multiple physical resources according to a partition scheme, and the database system may be scaled up or down on an as needed basis. In one embodiment, clients/subscribers may submit requests in a number of ways, e.g., interactively via graphical user interface (e.g., a console) or a programmatic interface to the database system. In one embodiment, time series database service 210 may provide a RESTful programmatic interface in order to submit access requests (e.g., to get, insert, delete, or scan data).

In one embodiment, clients 290 may encompass any type of client configurable to submit network-based requests to provider network 200 via network 280, including requests for time series database service 210 (e.g., to access item(s) in a series in time series database service 210 or to store data values in a time series database, such as measures, metrics, or other information collected by different devices implemented as part of an Internet of Things (IOT) architecture). In one embodiment a given client 290 may include a suitable version of a web browser, or may include a plug-in module or other type of code module that executes as an extension to or within an execution environment provided by a web browser. Alternatively in a different embodiment, a client 290 may encompass an application such as a database client/application (or user interface thereof), a media application, an office application or any other application that may make use of a time series in time series database service 210 to store and/or access the data to implement various applications. In one embodiment, such an application may include sufficient protocol support (e.g., for a suitable version of Hypertext Transfer Protocol (HTTP)) for generating and processing network-based services requests without necessarily implementing full browser support for all types of network-based data. That is, client 290 may be an application that interacts directly with provider network 200, in one embodiment. In one embodiment, client 290 may generate network-based services requests according to a Representational State Transfer (REST)-style network-based services architecture, a document- or message-based network-based services architecture, or another suitable network-based services architecture.

In some embodiments, clients of time series database service 210 may be implemented on resources within provider network 200 (not illustrated). For example, a client application may be hosted on a virtual machine or other computing resources implemented as part of another provider network service that may send access requests to time series database service 210 via an internal network (not illustrated) similar to the requests and interactions discussed with regard to client(s) 290.

In one embodiment, a client 290 may provide access to provider network 200 to other applications in a manner that is transparent to those applications. For example, client 290 may integrate with a database on time series database service 210. In such an embodiment, applications may not need to be modified to make use of a service model that utilizes time series database service 210. Instead, the details of interfacing to the time series database service 210 may be coordinated by client 290.

Client(s) 290 may convey network-based services requests to and receive responses from provider network 200 via network 280, in one embodiment. In one embodiment, network 280 may encompass any suitable combination of networking hardware and protocols necessary to establish network-based-based communications between clients 290 and provider network 200. For example, network 280 may encompass the various telecommunications networks and service providers that collectively implement the Internet. In one embodiment, network 280 may also include private networks such as local area networks (LANs) or wide area networks (WANs) as well as public or private wireless networks. For example, both a given client 290 and provider network 200 may be respectively provisioned within enterprises having their own internal networks. In such an embodiment, network 280 may include the hardware (e.g., modems, routers, switches, load balancers, proxy servers, etc.) and software (e.g., protocol stacks, accounting software, firewall/security software, etc.) necessary to establish a networking link between given client(s) 290 and the Internet as well as between the Internet and provider network 200. It is noted that in one embodiment, client(s) 290 may communicate with provider network 200 using a private network rather than the public Internet.

Time series database service 210 may implement ingestion routing nodes 230, in some embodiments. Ingestion routing nodes 230 may perform requests to store items in a time series of a time series database hosted in time series database service 210. For example, a client 290 may send a request to store an item in a time series to a network address or other endpoint which may be received at a load balancer which may implement one or more load balancing schemes to direct the request to one of ingestion routing nodes 230, in some embodiments. For example, ingestion nodes may apply various kinds of hash or other distribution schemes to identify which partition of a time series an item belongs to. Because ingestion routing nodes 230 may not be limited or assigned to particular time series databases, in some embodiments, ingestion routing nodes 230 may maintain partition schemes for storing items according to a partitioning scheme for the time series to which the item is to be added for any time series at any of the one or multiple time series databases that may be hosted by time series database service 210.

In some embodiments, time series database service 210 may also implement a data stream store, such as may be implemented by data stream storage nodes 240, each of which may manage one or more partitions 242 of a time series of a time series database on behalf of clients/users or on behalf of time series database service 210 which may be stored in storage (on storage devices attached to storage nodes 240 or in network storage accessible to storage nodes 240). Data stream storage nodes 240 may be implemented as part of a data stream service of provider network 200 (not illustrated) and utilized as the underlying storage for time series database service 210, in some embodiments. For example, each partition of a time series database may be a separate data stream that is hosted in the separate database service.

In some embodiments, time series database service 210 may implement stream processing nodes 250 to retrieve data from time series partitions, and store it to different storage tier nodes, such as storage tier nodes 260a to 260b. In this way, the different storage tier nodes 260 can ingest the time series data of a partition received from stream processing nodes 250. As noted above, different ingestion rates, and in some embodiments different partitioning schemes, may be implemented (or experienced) for different storage tiers. Control plane 220 may provide stream processing nodes with a mapping of partitions to storage nodes 260 (e.g., 2 copies of a partition in a first storage tier at two different nodes in storage tier nodes 260a and 4 copies of the partition in a second storage tier at four different nodes in storage tier nodes 260n).

Different storage tiers may offer different types of query processing (or other analysis request) performance, in some embodiments. For example, a hot storage tier may ingest time series data into an in-memory data structure for providing fast query responses. Another storage tier, such as a cold storage tier, may ingest time series data into persistent storage as files or data objects (e.g., instead of individual records as may be implemented in the hot storage tier), which may offer a richer set of query or other analysis request features than hot tier storage and larger period of time in which the time series database data is available (e.g., older data is available than would be accessible in hot tier storage) but may incur higher processing cost and time to respond to queries and other analysis requests).

In some embodiments, time series database service 210 may implement query routing nodes 270 to parse and dispatch queries to one or multiple time series in a time series database to the appropriate storage tier nodes 260 in different storage tiers, such as hot tier storage nodes or cold tier storage nodes, as discussed below with regard to FIG. 3.

In one embodiment, time series database service 210 may implement control plane 220 to implement one or more administrative components. In various embodiments, control plane 220 may direct the performance of different types of control plane operations among the nodes, systems, or devices implementing time series database service 210, in one embodiment. Control plane 220 may provide visibility and control to system administrators via administrator console 226, in some embodiments. Admin console 226 may allow system administrators to interact directly with time series database service 210 (and/or the underlying system). In one embodiment, the admin console 226 may be the primary point of visibility and control for time series database service 210 (e.g., for configuration or reconfiguration by system administrators). For example, the admin console may be implemented as a relatively thin client that provides display and control functionally to system administrators and/or other privileged users, and through which system status indicators, metadata, and/or operating parameters may be observed and/or updated. Control plane 220 may provide an interface or access to information stored about one or more detected control plane events, such as data backup or other management operations for a time series, at time series database service 210, in one embodiment.

Storage tier management 224 may provide resource allocation, in one embodiment, for storing additional data in time series submitted to database time series service 210. For instance, node management 224 may communicate with storage nodes 260 to initiate the performance of various control plane operations (such as requests to update or create a time series database, configure a time series database, etc.). In one embodiment, storage tier management 224 may include a node recovery feature or component that handles failure events for storage tier nodes 260, and/or query routing nodes 270 (e.g., adding new nodes, removing failing or underperforming nodes, deactivating or decommissioning underutilized nodes, etc.) which may include the creation of new copies at storage tier nodes, as discussed in detail below with regard to FIGS. 4-9.

Various durability, resiliency, control, or other operations may be directed by control plane 220. For example, data stream management 222 may detect split, copy, or move events for time series partitions 242 at storage nodes 240 in order to ensure that the storage nodes 240 maintain satisfy a minimum performance level for performing access requests. For instance, in various embodiments, there may be situations in which a partition (or a replica thereof) may need to be copied, e.g., from one storage node to another. For example, if there are three replicas of a particular partition, each hosted on a different physical or logical machine, and one of the machines fails, the replica hosted on that machine may need to be replaced by a new copy of the partition on another machine. In another example, if a particular machine that hosts multiple partitions of one or more tables experiences heavy traffic, one of the heavily accessed partitions may be moved (using a copy operation) to a machine that is experiencing less traffic in an attempt to more evenly distribute the system workload and improve performance.

In some embodiments, the partition moving process described above may be employed in partition splitting operations by data stream management 222 in response to the detection of a partition split event. For example, a partition may be split because it is large, e.g., when it becomes too big to fit on one machine or storage device and/or in order to keep the partition size small enough to quickly rebuild the partitions hosted on a single machine (using a large number of parallel processes) in the event of a machine failure. A partition may also be split when it becomes too "hot" (i.e. when it experiences a much greater than average amount of traffic as compared to other partitions). For example, if the workload changes suddenly and/or dramatically for a given partition, the system may be configured to react quickly to the change. In some embodiments, the partition splitting process described herein may be transparent to applications and clients/users, which may allow the data storage service to be scaled automatically (i.e. without requiring client/user intervention or initiation). In some embodiments, a client application could request a partition operation (e.g., a split, move, merge, etc.) via control plane 220.

In some embodiments, each time series partition 242 may be identified by a partition ID, which may be a unique number (e.g., a GUID) assigned at the time the partition is created. When a partition is split, two new partitions may be created, each of which may have a respective new partition ID, and the original partition ID may no longer be used, in some embodiments. In some embodiments, a partition may be split by the system using a split tool or process in response to changing conditions.

Split or move events may be detected by partition management 222, in various ways. For example, partition size and heat, where heat may be tracked by internally measured metrics (such as IOPS), externally measured metrics (such as latency), and/or other factors may be evaluated with respect to various performance thresholds, in some embodiments. System anomalies may also trigger split or move events (e.g., network partitions that disrupt communications between replicas of a partition in a replica group, in some embodiments. Partition management 222 (or node management 224) may detect storage node failures, or provide other anomaly control, in some embodiments.

Time series database service 210 may provide an application programming interface (API) for requesting various operations targeting tables, indexes, items, and/or attributes maintained on behalf of storage service clients. In some embodiments, the service (and/or the underlying system) may provide both control plane APIs and data plane APIs. The control plane APIs provided by time series database service 210 (and/or the underlying system) may be used to manipulate series-level entities, such as time series and indexes and/or to re-configure various time series. These APIs may be called relatively infrequently (when compared to data plane APIs). In some embodiments, the control plane APIs provided by the service may be used to create time series or at separate storage nodes, import time series, export time series, delete time series, perform various trend analysis or other time series evaluations, modify time series configurations or operating parameter for time series, and/or describe time series. The data plane APIs provided by time series database service 210 (and/or the underlying system) may be used to perform item-level operations, such as requests for individual items or for multiple items in one or more time series, such as queries, batch operations, and/or scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

Figure 3:
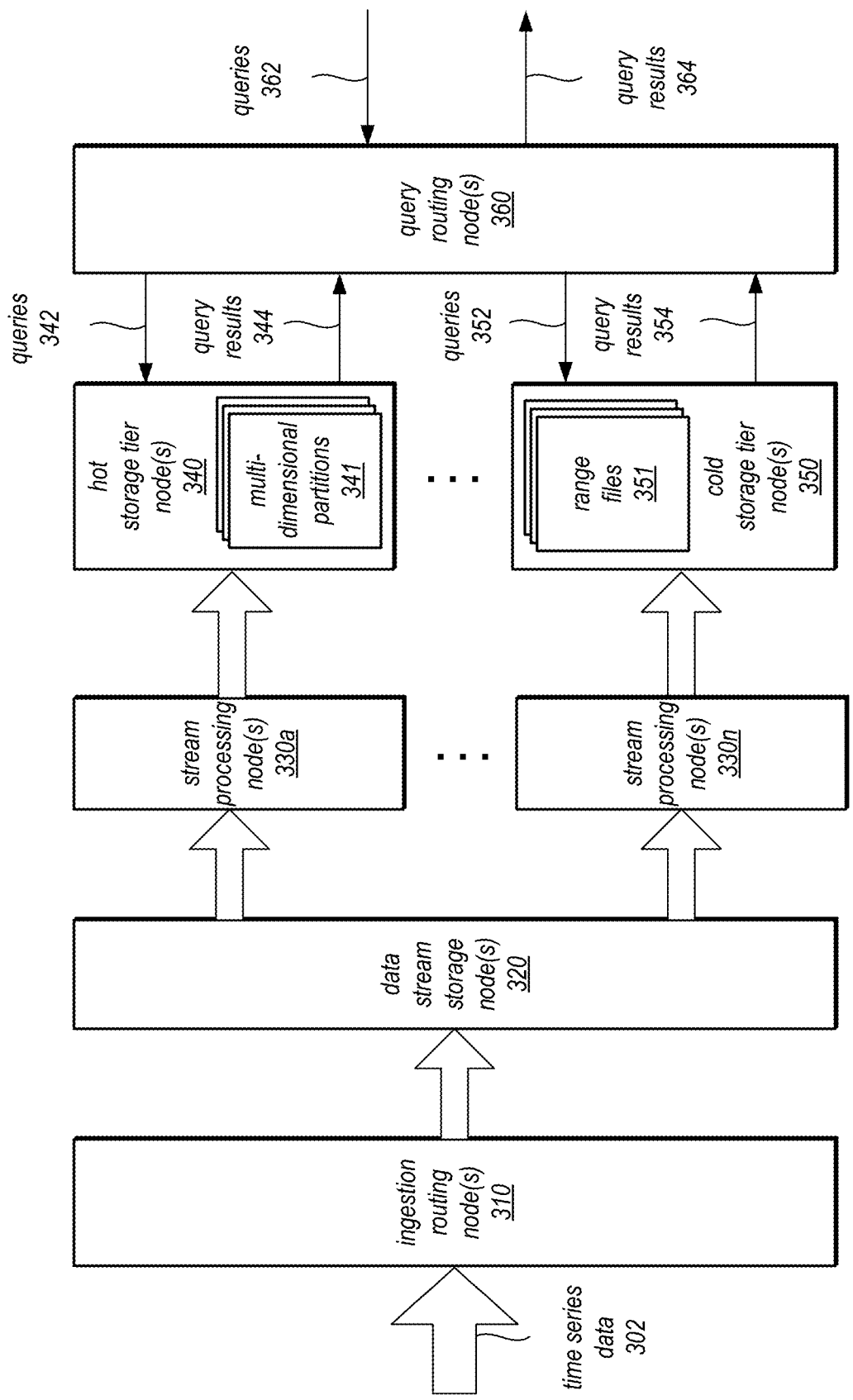
FIG. 3 is a logical block diagram illustrating interactions to update and query a time series database, according to some embodiments.

FIG. 3 is a logical block diagram illustrating interactions to access a time series database, according to some embodiments. An ingestion pipeline, technique or process may include receiving time series data 302 from a client of time series database service 210. For example, a submission API, or other request may accept time series data destined for an identified time series database, which ingestion routing node(s) 310 can then identify the appropriate data stream and data stream storage node(s) 320 that store the time series database identified for time series data 302. Stream processing node(s) 330a through 330n may then obtain time series data from data stream storage nodes 320 for ingestion into one or more storage tiers in order to make the time series data available for performing different queries 362.

For example, stream processing nodes 330a may store the time series data to hot tier node(s) 340 as multi-dimensional partitions 341. Multi-dimensional partitions 341 may be partitioned according to a spatial value (e.g., by hashing a value of a time series database record, like "user ID", to identify a range of hash values as belong to a spatial value range assigned to a multi-dimensional partition) and by a time-based range (e.g., records with timestamp values within a specified range assigned to the multi-dimensional partition). Stream processing node(s) 330n may store the time series data to cold tier nodes 350 as range files 351, in some embodiments. For example, range files 351 may be database objects stored in a database file format that stores a specified range of time in a range file (which may thus be a different partitioning—according to time alone—than multi-dimensional partitions 341, in some embodiments).

Stream processing nodes 330 may store the time series data to different storage tiers according to different respective ingestion rates (e.g., where the ingestion rate for cold tier storage nodes 350 is slower than the ingestion rate for hot tier storage nodes 340, in some embodiments). For instance, the different storage formats of different storage tiers, such as the in-memory storage format or the range file format may cause different rates of storing the data (e.g., a range file may store a larger amount of data and thus may take longer to "fill up" when updates are received). In some embodiments, the ingestion rates may be implemented to correspond with the availability requirements of time series data at a storage tier. For example, a "warm" storage tier (not illustrated) may have a faster ingestion rate than the cold storage tier because the warm storage tier may provide a view of the time series database that is closer to a current view of the time series database and/or a different partitioning of the timeseries database (e.g., partitioned according to different key or item values in records of the timeseries database) and thus may have to be updated more frequently in order to provide the view.

As illustrated in FIG. 3, clients of time series database service 210 (which may be different than the source of time series data 302 in some scenarios), may submit queries 362 via an interface to time series database service 210 (e.g., an API, an established connection, protocol, and/or query language, etc.). As noted above, query routing node(s) 360 can identify based on the type of query (and/or the workload of the underlying storage tier nodes) which storage tier nodes should perform the query. For instance, query routing nodes 360 may recognize queries to recent data (e.g., less than a time value threshold) and forward the request to hot tier storage nodes 340, which may maintain recent data in-memory in order to quickly perform queries, in some embodiments. Thus query routing nodes 360 may forward queries 342 to hot tier node(s) 340, which may provide query results 344 to query routing node(s) 360 which may then provide the results 364 to a requesting client. For queries to older data (or more complex operations, such as cross time series joins, time series analysis operations, etc.), query routing nodes 360 may forward the queries 352 on to cold tier storage nodes 350, which may be utilized to access time series data in slower storage (e.g., either from local storage or in a backup or archive store (not illustrated)). Cold tier node(s) 350 may perform the quer(ies) 352 and return results 354 to query routing node(s) 360, which may provide the query results 364 to a requesting client.

Figure 4:
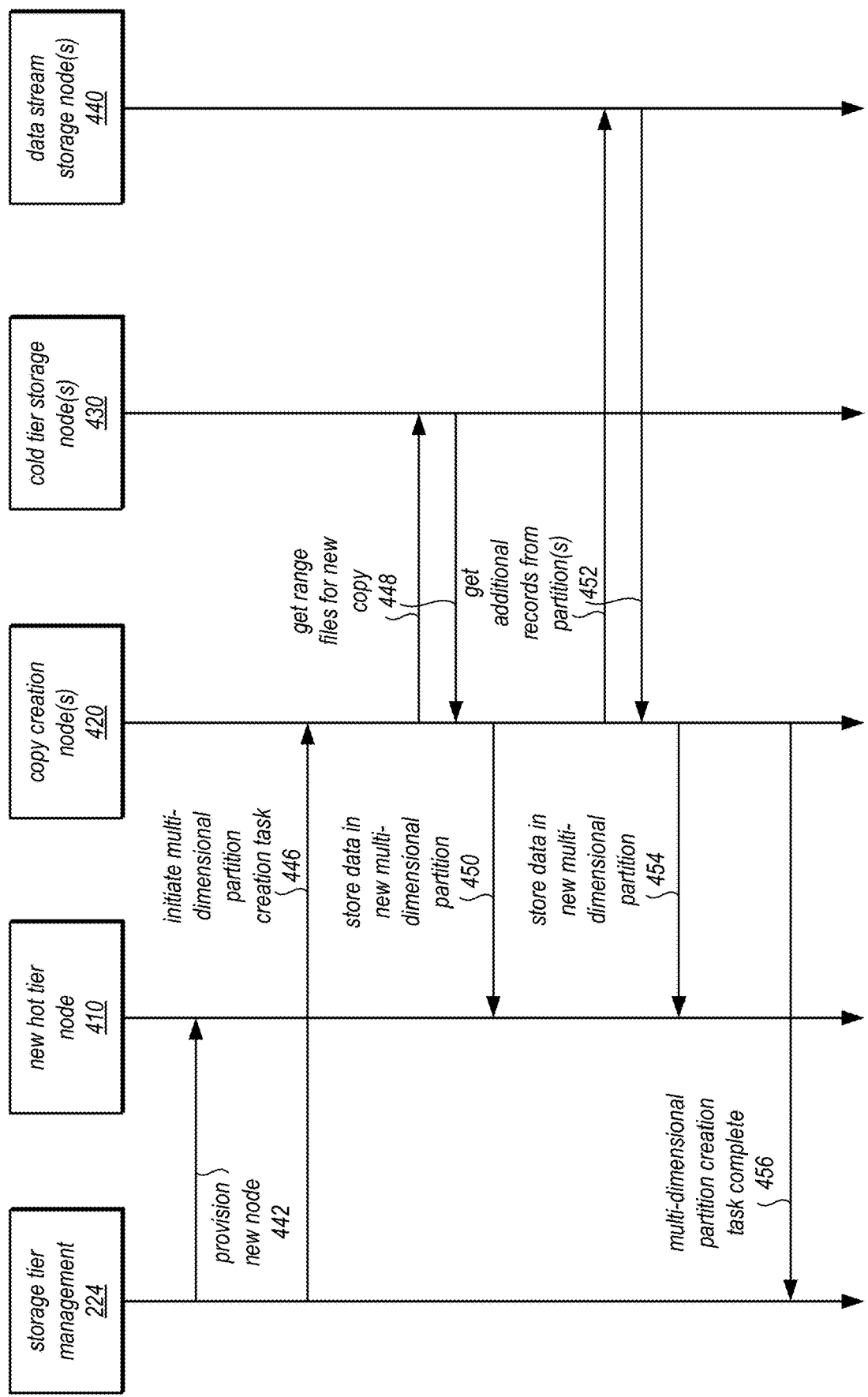
FIG. 4 is a sequence diagram illustrating adding a new copy to a hot storage tier using data obtained from another storage tier, according to some embodiments.

As noted above storage tier management 224 of time series database service 210 may create or otherwise add a node to store a new copy of a time series database in various scenarios (e.g., node failures, changes in load or demand to increase query processing capacity, client requests, partition splits or moves). Different techniques for creating the replica using different resources in time series database service 210 may be performed by storage tier management 224, in some embodiments. FIG. 4 is a sequence diagram illustrating adding a new copy to a hot storage tier using data obtained from another storage tier, according to some embodiments.

Storage tier management 224 may detect an event (as discussed below with regard to FIG. 8) or otherwise determine to add a copy, such as a multi-dimensional partition, to a host storage tier. Storage tier management 224 may provision 442 a new hot tier storage node 410. For example, a node may be obtained from a pool of available nodes (e.g., pre-configured to execute hot tier storage operations or applications) and assigned (e.g., in metadata, as discussed below) to store the new copy of the time series database. In some embodiments, a fleet of nodes may perform tasks to create new copy of a time series database. In this way, the workload to obtain, configure or format, and write data may be mostly handled by nodes that are not performing operations for clients of time series database service 210, such as nodes not performing queries. In this way, the work to create a new copy that could impact client application performance may be minimized (or eliminated), in some embodiments.

As indicated at 446, a request to initiate creation of the copy, such as the multi-dimensional partition, may be sent to copy creation node(s) 420. To create the copy, various information may be determined by copy creation node(s) 420 (or by storage tier management 224, which may then provide the information to copy creation node(s) 420). For example, FIG. 5 is a logical diagram of a data stream for creating a new copy of a multi-dimensional partition, according to some embodiments. A data stream, such as data stream for a multi-dimensional partition 530, that is being created may be considered to determine where different portions of the copy are to be obtained.

In some embodiments, a creation point 524 may be determined. A creation point 524 may indicate the point in time or other state of the copy (e.g., the multi-dimensional partition) that is being created. Additional data, such as data after initiation of copy creation 516 (e.g., data with timestamps or sequence numbers after creation point 524) may be added to the copy, in some scenarios (e.g., where the copy being created is not yet full, according to data values, size, and/or time, for instance). In some embodiments, creation point 524 may be identified by a timestamp, sequence number, or other time series data point.

In some embodiments, a creation point 524 may indicate a version indication for the copy. For example, as illustrated in FIG. 6B, below, a metadata version for a multi-dimensional partition ID may be maintained. For requests to store data to a multi-dimensional partition, the requests may include a metadata version for the multi-dimensional partition. When a new multi-dimensional partition is to be created, a new (e.g., incremented) metadata version identifier for the multi-dimensional partition may also be created. The new metadata version identifier may be the creation point 524. Consider an example, where we add a new copy "R2" for multi-dimensional partition at metadata version "v5." Any data committed with version <v5 is old data (not on R2), and any data committed to version >=v5 is new data (will be committed on R2), in this example.

Storage hosts for a multi-dimensional partition may reject storage requests (e.g., from stream processing nodes 330) if the metadata version identifier is less than the current metadata version identifier. In some embodiments, a technique may be implemented to complete queued or otherwise obtained updates from a time series partition (e.g., obtained from data stream storage node(s) 320 at stream processing nodes 330) before changing the metadata version identifier.

In some embodiments, other stages or features of the time series database may influence he techniques for determining the creation point 524. For example, a time series database may be stored across multiple time series partitions, as discussed above with regard to FIGS. 2 and 3. These time series partitions may not, in some embodiments, directly map to a copy (e.g., as a copy may have different time ranges, value ranges, etc.). FIGS. 6A-6B illustrate mappings between time series data partitions and multi-dimensional data partitions stored and accessed for performing queries in a hot storage tier, according to some embodiments.

In the illustrated example in FIG. 6A, time series data partition 612 may include data that is divided between multi-dimensional partition 622 and 624. Similarly, time series data partition 614 may include data that is divided between multi-dimensional partition 624 and 626. In this example, multi-dimensional partition 624 may include data from two different time series data partitions 614. When implementing metadata tracking, tracking information for each source of a multi-dimensional partition may be maintained, in some embodiments, as a creation point for each source (e.g., each time series data partition) may need to be determined. For instance, in FIG. 6B, a mapping between multi-dimensional partition ID, time series data partition ID, last committed sequence number (e.g., a timestamp or other ordering value, such as a monotonically increasing logical sequence number (LSN), and last committed metadata version may be maintained. Suppose, for instance, that multi-dimensional partition 624, version v5 is the dividing point between old data (committed with <v5) and new data (committed with >=v5), then the dividing point for each time series data partition 612 and 614 would be the last committed sequence number at multi-dimensional data partition version v5 (40 for P1, and 120 for P2). Any records with a lower sequence number may be old data (already committed with version <=v5), and any record with a higher sequence number may be new data (will be committed with version >=v5).

Tracking, updating, and/or maintaining metadata for copies, like the metadata illustrated in FIG. 6B, may offer performance benefits to a time series database. For instance, such metadata may provide visibility for what data is replicated and where, which be useful for operational investigation/debugging, among other scenarios/features. Such metadata may also be used in order to provide a strong validation/assertion technique for data replication, where data is only stored to copies if the updates prior to that update have been stored (e.g., update N is stored after update N−1), in some embodiments.

Returning to FIG. 5, a determination may also be made for data that is present in cold tier storage, such as data 512 and data that is not yet ingested into the cold tier, such as data 514. To identify the presence of a data, a cold tier checkpoint 522 may be utilized. For example, a stream processor 330n that writes to cold tier storage node(s) 350 may update a sequence number or other ordering value in metadata for cold tier storage, which may indicate a latest saved value in a range file 351. This cold tier checkpoint 522 may be updated each time a new range file is written, in some embodiments. Thus, when determining the presence of data in cold tier storage, the difference between the cold tier checkpoint 522 and the creation point 524 may indicate data to be obtained from a location different than cold tier storage, such as a time series data partition (or another storage tier not illustrated).

Returning to FIG. 4, copy creation node(s) 420 may utilize a creation point as well as other information, as discussed above to obtain the data to create the new multi-dimensional partition, in some embodiments. For instance, as indicated at 448, copy creation node(s) 420 may submit one or more requests to cold tier storage node(s) 430 to obtain the range file(s) needed to create the new copy. Note that one or a combination of range files may be retrieved to create the new copy. Copy creation nodes may extract the data from a range file (or other data object) and reformat, filter, combine, restructure, or otherwise convert data values as stored in range files for storage as a multi-dimensional partition (e.g., encrypt differently, compress differently, or leave unencrypted or uncompressed). In some embodiments, cold tier storage node(s) 430 may implement a programmatic interface (e.g., an API) that allows a client like copy creation node(s) 420 to specify a time range (and/or other data value features) so that cold tier storage node(s) 430 can return the range files that include data that satisfies the specified values. In some embodiments, copy creation node(s) 420 may utilize other metadata that maps range files to time series data partitions or multi-dimensional data partitions, in order to specify particular range files to return.

Copy creation node(s) 420 may get data not present in cold tier storage from the update log, in some embodiments. For example, copy creation node(s) 420 may send requests to get additional records from partition(s) as indicated at 452 to data stream storage node(s) 440. In some embodiments, these requests may specify a range of values (e.g., sequence numbers, time values, etc.) in order to obtain the updates from a cold tier storage point up to a creation point. Copy creation node(s) 420 may then apply (e.g., append) the updates to the new copy generated from range files to complete and store the data, as indicated at 454, as a new copy of the multi-dimensional partition at new hot tier node 410. When the new copy is created, the copy creation node(s) 420 may send an indication to storage tier management 224 that the multi-dimensional partition creation task is complete, in some embodiments.

Although not depicted in FIG. 4, when the new hot tier node is provisioned, storage tier management 224 may send a request to stream processor(s) (e.g., stream processors 330a in FIG. 3) to begin sending new data (e.g., after a creation point) to the new hot tier node 410. This may occur in parallel to the operations performed in FIG. 4 so that when the copy of the data before the creation point is ready, the new copy is already caught up to the latest version to be provided by that new multi-dimensional partition in the hot storage tier, in some embodiments.

Although the discussion of FIGS. 4-6B utilized multi-dimensional partitions as an example of a copy, other copies (e.g., that combine aspects of cold tier storage and hot tier storage in a "warm" or other type of storage tier) of a time series database that utilize different partitioning schemes, formats, data structures, or storage hosts may also utilize similar interactions and techniques to create a new copy across replicas and thus the previous examples are not intended to be limited to multi-dimensional partitions, in some embodiments.

Figure 7:
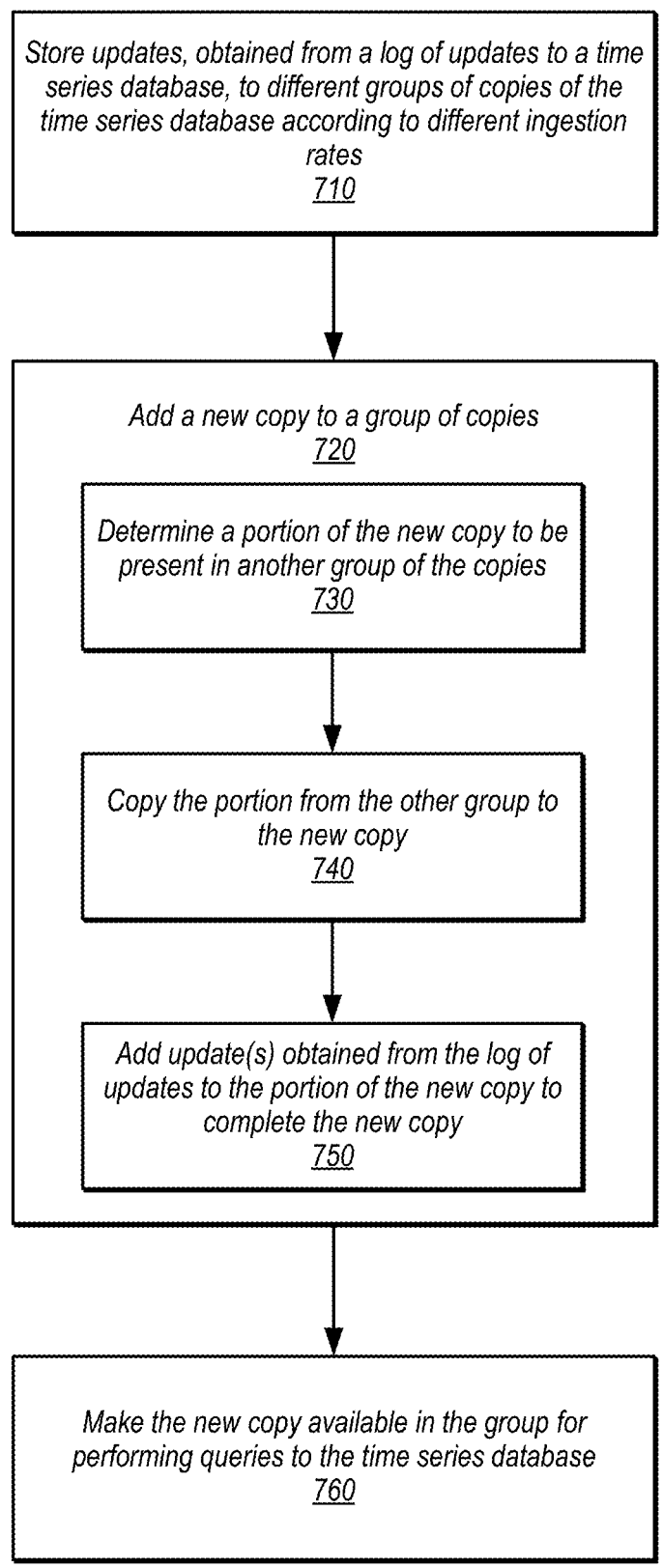
FIG. 7 is a high-level flowchart illustrating various methods and techniques to implement creating replicas from across storage groups of a time series database, according to some embodiments.

The examples of a time series database that implements creating replicas from across storage groups of a time series database as discussed in FIGS. 2-6B above have been given in regard to a time series database service. However, various other types of database systems that organize, store, or otherwise provide access to data that is stored according to time values (e.g., indexed based on timestamps) may implement creating replicas from across storage groups of a time series database, in other embodiments. FIG. 7 is a high-level flowchart illustrating various methods and techniques to implement creating replicas from across storage groups of a time series database, according to some embodiments. These techniques, as well as the techniques discussed with regard to FIGS. 7-8, may be implemented using components or systems as described above with regard to FIGS. 2-6B, as well as other types of databases, storage engines, or distributed storage systems, and thus the following discussion is not intended to be limiting as to the other types of systems that may implement the described techniques.

As indicated at 710, updates, obtained from a log of updates to a time series database, may be stored to different groups of copies of the time series database according to different ingestion rates, in some embodiments. For instance, as discussed above with regard to FIG. 1, different groups of copies may offer different views of a time series database or performance for accessing the time series database. The rate at which data is added to a copy may depend upon the provided view or performance of the group of copies. These copes, as also noted above, may be used to perform queries to the time series database. A query, for instance, may specify a time value range and other predicate features (e.g., based on other data values of time series database records).

As indicated at 720, a new copy may be added to one of the groups of copies, as indicated at 720. Note that groups of copies may include more than one, one, or no available copies. For instance, a hot tier storage group may typically include three or more copies, but due to failures or other causes, the copies may be unavailable to perform.

Adding a new copy may include determining a portion of the new copy to be present in another group of the copies, as indicated at 730. For instance, as discussed above with regard to FIGS. 5-6B, a checkpoint or other information indicative of the range of values present in a group of copies, may be used to determine what data can be obtained from that group of copies. As indicated at 740, the portion present in the other group may be copied to the new copy. In at least some embodiments, the other group of copies may still be available to perform queries while also providing data to the new copy. Similarly, the group to which the new copy is being added may also be available to perform queries. In some embodiments, multiple different groups of copies may provide the data for the new copy. The presence of data may be determined according to the ingestion rate, in some embodiments. For example, if data is known to be ingested at a rate that batches updates and performs them together every 30 minutes, then an update with a timestamp later than the most recent batch update time can be known to be not present. Other data structures, such as bloom filters, may be implemented to indicate the presence or absence of data, in some embodiments.

Adding a new copy may also include adding updates obtained from the log of updates to the portion of the new to complete the copy, as indicated at 750. For example, a range of log values may be read that includes the updates in order to obtain the update(s) and add them to the new copy. In some embodiments, an update may include a record, marker, or other indication, of a change to the timeseries database that indicates the new copy and/or delineates the point after which "new" data, such as data received after a creation point as discussed below, is received.

As indicated at 760, the new copy may be made available in the group for performing queries to the time series database, in some embodiments. For instance, a load balancer, query router, or other access or flow control system may be updated to include the new copy as available in the group. As noted above with regard to FIG. 4, in some embodiments, new updates to the copy that were received after creation of the new copy began may be made while the new copy is being created. In this way, the new copy may be current when the copy creation is complete.

Figure 8:
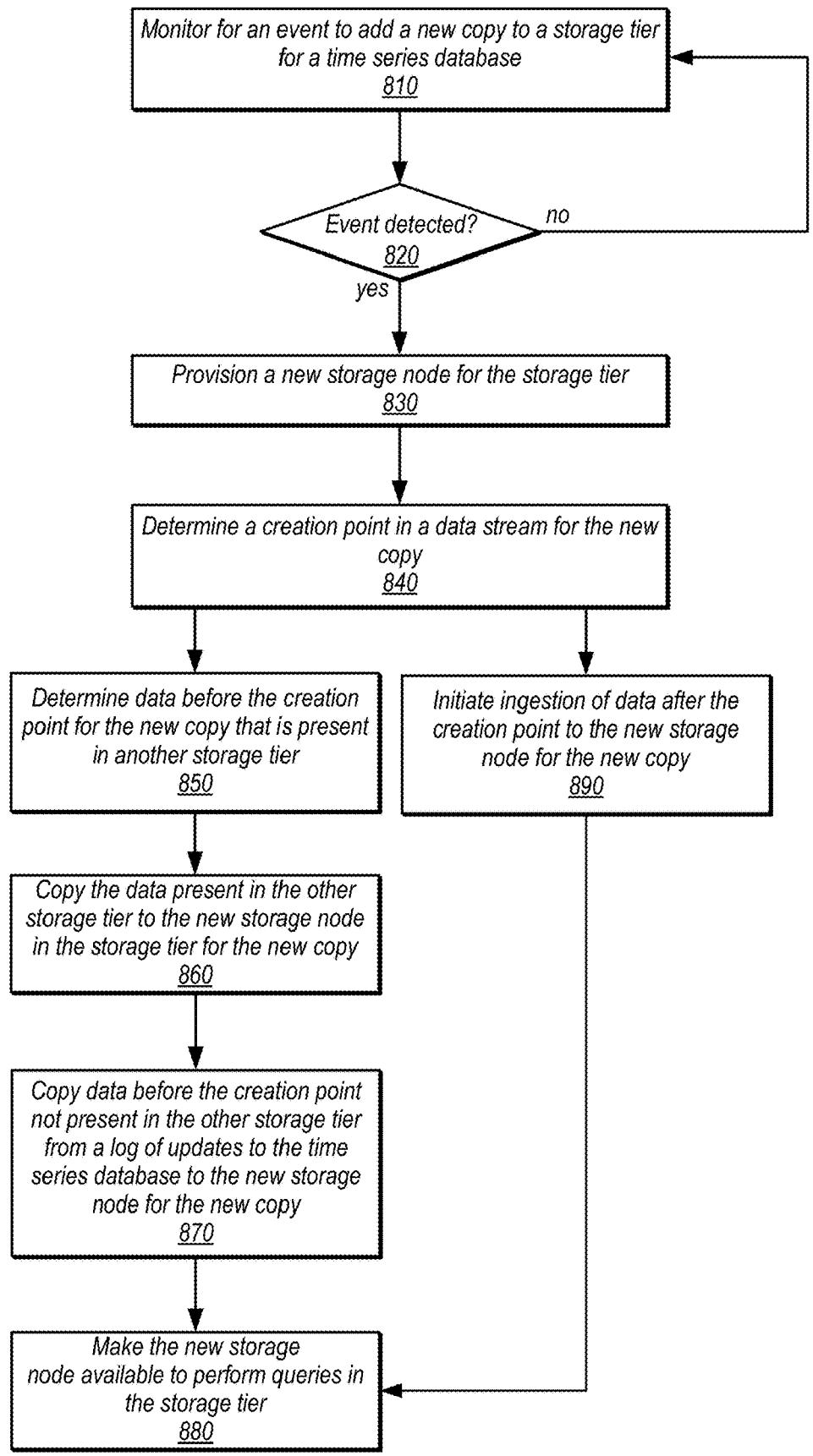
FIG. 8 is a high-level flowchart illustrating various methods and techniques to handle events to create replicas of a time series database, according to some embodiments.

The techniques for adding a new copy to a group of copies may be implemented in an automated fashion. A control plane, or other management system, for a time series database may create a new copy to add to a group of copies. FIG. 8 is a high-level flowchart illustrating various methods and techniques to handle events to create replicas of a time series database, according to some embodiments.

As indicated at 810, a control plane, or other management feature of a time series database, may monitor for an event to add a new copy to a storage tier for storing a portion of a time series database, in some embodiments. For example, a control plane may monitor storage nodes for failure, over utilization, or another event to add a copy to a storage tier, such as an event that triggers a move of a portion of a time series database from one storage tier to another. If an event is detected, as indicated by the positive exit from 820, then a new storage node may be provisioned for the storage tier, as indicated at 830, in some embodiments. For example, a control plane may obtain a lease or permission to utilize a storage node system from a pool of available nodes, directing the installation or configuration of storage tier node software or other information, reserving or allocating space on an existing storage tier node storing another portion for another time series database (e.g., for another user account) as storage tier nodes may be multi-tenant, in some embodiments).

As indicated at 840, a creation point in a data stream for the new copy may be determined, in some embodiments. A creation point, as discussed above with regard to FIG. 5, may indicate a state of the new copy to be created. The creation point may provide a consistent view of the time series database to available at the storage tier at a corresponding point in time, for instance. Determination of the creation point may correspond to the time the event was detected and/or a view of the time series database that should be provided. For instance, if a hot storage tier lost all available copies of a multi-dimensional partition, then creation point may be the point at which the last available copy in the hot storage tier became unavailable.

As indicated at 850, data before the creation point that is present in another storage tier may be determined, in some embodiments. As noted above, the ingestion rates of other storage tiers may indicate or determine the presence of data (e.g., if updates are stored every five minutes, then an update less than five minutes old may not be present). Alternatively, the view of a time series database provided by a copy in a storage tier (e.g., a value-specific arrangement of data) may indicate whether the data is available in a storage tier (e.g., if a storage tier provides the last 6 minutes of user data, but no user update is received within the last 6 minutes, then that user may not be present in the storage tier, even if user updates older than 6 minutes may be included in the new copy and even though the ingestion rate for the storage tier is every 5 seconds). As indicated at 860, data present in the other storage tier may be copied to the new storage node in the storage tier for the new copy, in some embodiments.

As indicated at 870, data before the creation point that is not present in the other storage may be copied from a log of updates to the time series database to the new storage node for the new copy, in some embodiments. In some embodiments, a determination may be first made that the remaining data to be copied is not available in another storage tier. As indicated at 880, the new storage node may then be made available to perform queries in the storage tier, in some embodiments. In some embodiments, the storage node may not be made available to perform queries until both the data before the data is copied from the log (as indicated at 870) and ingestion of data after the creation point (as indicated at 870) are successfully completed.

As indicated at 890, once the creation point is determined, ingestion of data after the creation point may be initiated to the new storage node for the new copy, in some embodiments. For example, a storage node or host for the time series database may begin pushing out updates to the new copy.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 9:
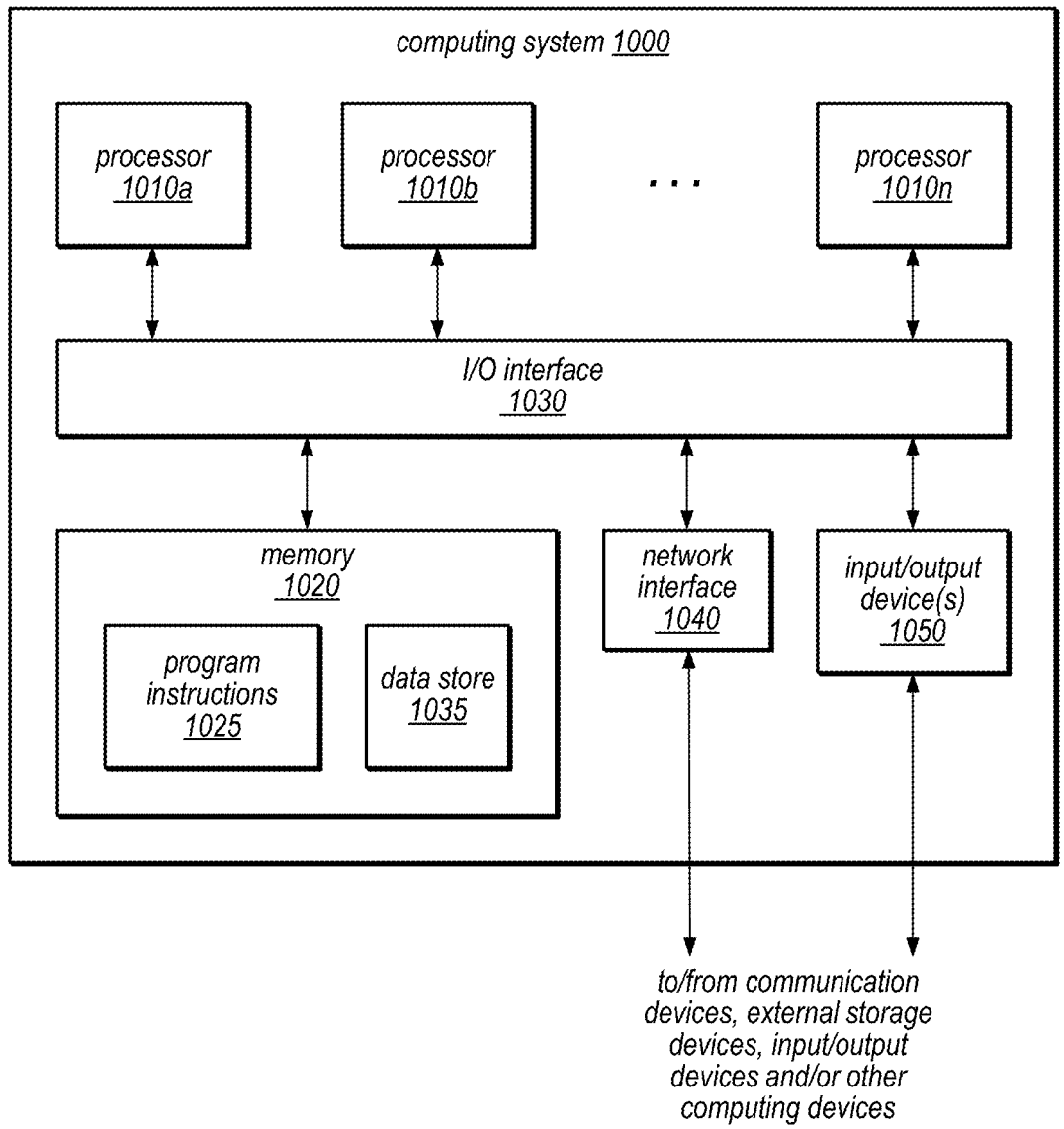
FIG. 9 is a block diagram illustrating an example computing system, according to some embodiments.

Embodiments to implement implements creating replicas from across storage groups of a time series database as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices, in one embodiment. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions, in one embodiment. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 1020 may store program instructions 1025 and/or data accessible by processor 1010, in one embodiment. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. A computer-accessible medium may include non-transitory storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040, in one embodiment.

In one embodiment, I/O interface 1030 may be coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000, in one embodiment. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000, in one embodiment. Multiple input/output devices 1050 may be present in computer system 1000 or may be distributed on various nodes of computer system 1000, in one embodiment. In some embodiments, similar input/output devices may be separate from computer system 1000 and may interact with one or more nodes of computer system 1000 through a wired or wireless connection, such as over network interface 1040.

As shown in FIG. 9, memory 1020 may include program instructions 1025, that implement the various embodiments of the systems as described herein, and data store 1035, comprising various data accessible by program instructions 1025, in one embodiment. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
a plurality of nodes configured to implement a time series database, wherein the plurality of nodes respectively comprising at least one processor and a memory storing program instructions that when executed by the respective at least one processor cause the plurality of nodes to:
record updates to the time series database in a log of updates;
ingest the updates obtained from the log of updates at different storage tiers of the time series database according to different respective ingestion rates;
add a new copy of the time series database to a first storage tier of the different storage tiers, wherein to add the new copy of the time series database the program instructions cause the plurality of nodes to:
for a portion of the new copy determined to be present in a second storage tier of the different storage tiers, copy the portion from the second storage tier to the new copy, wherein the portion of the new copy is determined based on a difference between the respective ingestion rate for storing updates to the second storage tier and the respective ingestion rate for storing updates to the first storage tier, wherein the respective ingestion rate for storing updates to the second storage tier is slower than the respective ingestion rate for the first storage tier; and
add at least one update obtained from the log of updates to the portion of the new copy to complete the new copy, wherein the update was stored to the first storage tier but not the second storage tier according to the slower respective ingestion rate for the second storage tier.

2. The system of claim 1, wherein the different storage tiers are implemented by different respective storage nodes of the plurality of nodes, wherein one or more other nodes of the plurality of nodes implement a control plane for the time series database and one or more copy creation nodes, and wherein the program instructions further cause the plurality of nodes to:
  monitor, by the control plane, the first storage tier to detect an event to add the new copy to the first storage tier; and
  responsive to the detection of the event, instruct, by the control plane, the one or more copy creation nodes to perform the addition of the new copy of the first storage tier.

3. The system of claim 1, wherein the program instructions further cause the plurality of nodes to initiate ingestion of new updates to the time series database for the new copy while the new copy is being added.

4. The system of claim 1, wherein the time series database is implemented as part of a time series database service offered by a provider network, where the first storage tier is a hot storage tier, wherein the new copy is a multi-dimensional partition, wherein the second storage tier is a cold storage tier that stores data for the time series database according to a different partitioning scheme than the hot storage tier, and wherein the portion of the new copy is obtained from one or more range files stored as part of the cold storage tier.

5. A method, comprising:
  storing updates, obtained from a log of updates to a time series database, to different groups of copies of the time series database according to different respective ingestion rates, wherein the different groups of copies are used to perform queries to the time series database;
  adding a new copy of the time series database to a first group of the different groups of copies, comprising:
    for a portion of the new copy determined to be present in a second group of the different groups of copies, copying the portion from the second group to the new copy, wherein the portion of the new copy is determined based on a difference between the respective ingestion rate for storing updates to the second group and the respective ingestion rate for storing updates to the first group, wherein the respective ingestion rate for storing updates to the second group is slower than the respective ingestion rate for the first group; and
    adding at least one update obtained from the log of updates to the portion of the new copy to complete the new copy, wherein the update was stored to the first group but not the second group according to the slower respective ingestion rate for the second group.

6. The method of claim 5, wherein adding the new copy to the first group further comprises:
  determining a creation point for the new copy;
  comparing the creation point to a last checkpoint for storing updates to the second group to determine the portion of the new copy that is present in the time series database; and
  wherein the at least one update obtained from the log is identified between the creation point and the last checkpoint.

7. The method of claim 6, further comprising initiating ingestion of new updates to the time series database that occur after the creation point at the new copy while the new copy is being added.

8. The method of claim 5, wherein the first group does not include an available copy of the time series database.

9. The method of claim 5, further comprising using another copy in the first group to perform a query received while the new copy is being added, wherein the other copy is not used to add the new copy to the first group.

10. The method of claim 5, wherein copying the portion from the second group to the new copy comprises:
  obtaining one or more data objects from the second group that include the portion; and
  extracting the portion from the one or more data objects; and
  storing the portion to a storage node for the new copy in the first group.

11. The method of claim 10, wherein the first group and the second group store data for the time series database according to different respective partitioning schemes.

12. The method of claim 5, further comprising:
  monitoring the first group to detect an event to add the new copy to the first group; and
  responsive to the detection of the event, performing the adding of the new copy to the first group.

13. The method of claim 5, further comprising:
  after completing the new copy, making the new copy available in the first group for performing queries to the time series database.

14. One or more non-transitory, computer-readable storage media, storing program instructions that when executed on or across one or more computing devices cause the one or more computing devices to implement:
  obtaining a plurality of updates from a log of updates to a time series database;
  storing the plurality of updates to different groups of copies of the time series database according to different respective ingestion rates, wherein the different groups of copies are used to perform queries to the time series database;
  adding a new copy of the time series database to a first group of the different groups of copies, comprising:
    for a portion of the new copy determined to be present in a second group of the different groups of copies, copying the portion from the second group to the new copy, wherein the portion of the new copy is determined based on a difference between the respective ingestion rate for storing updates to the second group and the respective ingestion rate for storing updates to the first group, wherein the respective ingestion rate for storing updates to the second group is slower than the respective ingestion rate for the first group;
    obtaining at least one of the updates from the log of updates; and
    adding the at least one update to the portion of the new copy to complete the new copy, wherein the at least one update was stored to the first group but not the second group according to the slower respective ingestion rate for the second group.

15. The one or more non-transitory, computer-readable storage media of claim 14, wherein the one or more non-transitory, computer-readable storage media store additional program instructions that when executed by the one or more computing devices cause the one or more computing devices to further implement storing new updates to the time series database at the new copy while the new copy is being added.

16. The one or more non-transitory, computer-readable storage media of claim 14, wherein another portion of the copy is obtained and copied to the new copy from a third group of the different groups.

17. The one or more non-transitory, computer-readable storage media of claim 14, wherein the one or more non-transitory, computer-readable storage media store additional program instructions that when executed by the one or more computing devices cause the one or more computing devices to further implement:

after completing the new copy, making the new copy available in the first group for performing queries to the time series database.

18. The one or more non-transitory, computer-readable storage media of claim 14, wherein adding the new copy to the first group, further comprises:

determining a creation point for the new copy; and comparing the creation point to a last checkpoint for storing updates to the second group to determine the portion of the new copy that is present in the time series database;

wherein the at least one update obtained from the log is identified between the creation point and the last checkpoint.

19. The one or more non-transitory, computer-readable storage media of claim 14, wherein the one or more non-transitory, computer-readable storage media store additional program instructions that when executed by the one or more computing devices cause the one or more computing devices to further implement:

detecting a failure of one or more copies of the time series database in the first group; and responsive to the detection of the failure, performing the adding of the new copy to the first group.

20. The one or more non-transitory, computer-readable storage media of claim 14, wherein the time series database is implemented as part of a time series database service offered by a provider network, where the first group stores copies of the time series database according to a different durability characteristic than the second group.

* * * * *